US009619922B2

(12) United States Patent
Nichols et al.

(10) Patent No.: US 9,619,922 B2
(45) Date of Patent: Apr. 11, 2017

(54) DISTRIBUTION CACHING FOR DIRECT LIGHTS

(71) Applicant: Disney Enterprises, Inc., Burbank, CA (US)

(72) Inventors: Gregory Nichols, North Hollywood, CA (US); Peter Kutz, Los Angeles, CA (US); Christian Eisenacher, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 360 days.

(21) Appl. No.: 14/481,731

(22) Filed: Sep. 9, 2014

(65) Prior Publication Data

US 2016/0071308 A1 Mar. 10, 2016

(51) Int. Cl.
*G06T 15/50* (2011.01)
*G06T 15/06* (2011.01)

(52) U.S. Cl.
CPC .............. *G06T 15/06* (2013.01); *G06T 15/50* (2013.01)

(58) Field of Classification Search
CPC ................................ G06T 15/06; G06T 15/50
See application file for complete search history.

(56) References Cited

U.S. PATENT DOCUMENTS

| 2010/0034426 | A1* | 2/2010 | Takiguchi | .......... G01C 21/3602 382/106 |
| 2014/0327673 | A1* | 11/2014 | Sousa | .................... G06T 15/506 345/426 |
| 2014/0375641 | A1* | 12/2014 | Bakalash | ................ G06T 15/80 345/426 |
| 2014/0375643 | A1* | 12/2014 | Bakalash | ................ G06T 15/06 345/426 |

OTHER PUBLICATIONS

Georgiev et al., "Importance Caching for Complex Illumination", Eurographics, vol. 31 (2012), No. 2, pp. 701-710.

* cited by examiner

*Primary Examiner* — Phi Hoang
(74) *Attorney, Agent, or Firm* — Farjami & Farjami LLP

(57) ABSTRACT

There is provided a system and method of distribution caching for direct lights in a scene. The system including a memory and a processor configured to execute a rendering software application to shoot a plurality of rays through a scene that includes a plurality of lights, generate a plurality of cache points at different locations throughout the scene based on the shooting of the plurality of rays, compute a list of lights for each cache point from the plurality of cache points, the list of lights including lights from the plurality of lights that provide illumination at a location of the cache point, and store the plurality of cache points in a memory. The processor may further be configured to execute the rendering software application to render the scene using the cache point database.

20 Claims, 3 Drawing Sheets

DISTRIBUTION CACHING FOR DIRECT LIGHTS

BACKGROUND

In computer animation, computer systems and software may be used to render a scene. When rendering a scene using Monte Carlo path tracing, the ray paths that ultimately matter are the ones that hit light sources that emit light, as those are the paths that actually contribute illumination to the scene. Given enough ray paths and rendering time, a path tracer will usually find these light sources by chance when bouncing rays around in the scene. However, convergence is generally much faster when the renderer knows where the light sources are and can shoot the rays directly at them. In practice, direct light sampling of this nature is desired for rendering converged images in a reasonable timeframe.

Scenes that include many light sources present significant challenges. For example, given a fixed ray sample budget, it is important to sample light sources that are most likely to contribute meaningful illumination, such as by sampling bright light sources rather than dim light sources. A key challenge is thus that the importance of a light source varies throughout the scene. For example, light sources that are important in one area of the scene may be completely unimportant in another area of the scene. This importance is based on the distance between the light source and the surface it illuminates, the orientation of the light source with respect to the orientation of the surface it illuminates, and other similar factors.

SUMMARY

The present disclosure is directed to distribution caching for direct lights, substantially as shown in and/or described in connection with at least one of the figures, as set forth more completely in the claims.

DETAILED DESCRIPTION

Figure 1:
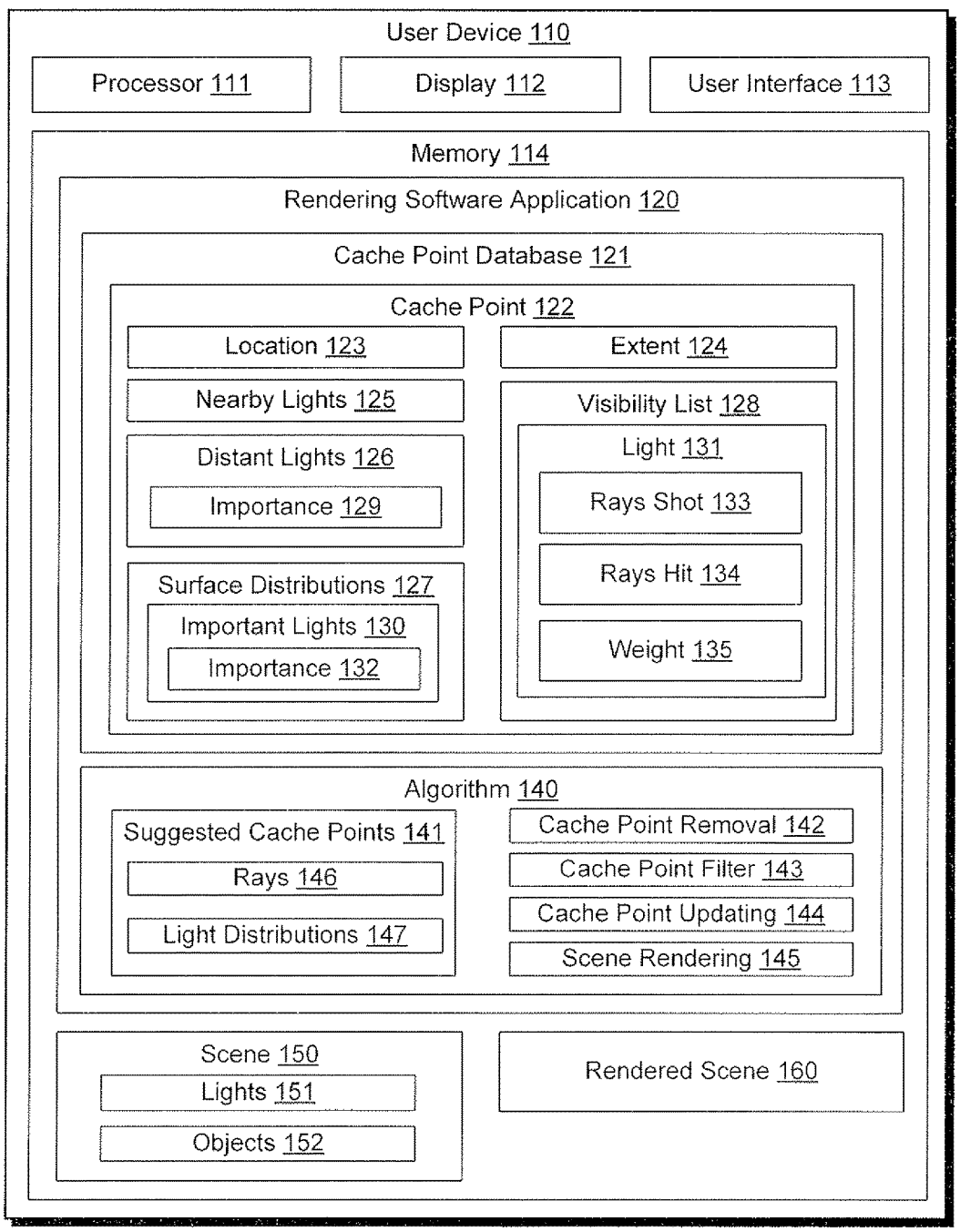
FIG. 1 presents a system for distribution caching for direct lights, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not drawn to scale, and are not intended to correspond to actual relative dimensions.

FIG. 1 presents a system for distribution caching for direct lights, according to one implementation of the present disclosure. FIG. 1 includes user device 110, which includes processor 111, display 112, user interface 113, and memory 114. Memory 114 includes rendering software application 120, scene 150, and rendered scene 160. Rendering software application 120 includes cache point database 121 and algorithm 140. Cache point database 121 includes cache point 122, which includes location 123, extent 124, nearby lights 125, distant lights 126, surface distributions 127, and visibility list 128. Distant lights 126 include importance 129. Surface distributions 127 include important lights 130, which includes importance 132. Visibility list 128 includes light 131, which includes rays shot 133, rays hit 134, and weight 135. Algorithm 140 includes suggested cache points, cache point removal 142, cache point filter 143, cache point updating 144, and scene rendering 145. Suggested cache points 141 includes rays 146 and light distributions 147. Scene 150 includes lights 151 and objects 152.

User device 110 can be a personal computer, a server, a mobile phone, a tablet, or any other device capable of executing rendering software application 120. As shown in FIG. 1, user device 110 includes display 112 and input interface 113. Input interface 113 may comprise, for example, a keyboard, a mouse, a game controller, a touch-screen input, a thermal and/or electrical sensor, or any other device capable of accepting user input for use with user device 110. Display 112 can be a liquid crystal display (LCD) screen built into user device 110. In alternative implementations of the present disclosure, display 112 may be another type of display hardware, such as cathode-ray tubes (CRT) monitors. In yet other implementations, display 112 may also be touch sensitive and may serve as input interface 113.

User device 110 further includes processor 111 and memory 114. Processor 111 may be configured to access memory 114 to store received input or to execute commands, processes, or programs stored in memory 114, such as rendering software application 120. Processor 111 may correspond to a processing device, such as a microprocessor or similar hardware processing device, or a plurality of hardware devices. However, in other implementations, processor 111 refers to a general processor capable of performing the functions required of user device 110. Memory 114 is a sufficient memory capable of storing commands, processes, and programs for execution by processor 111. Memory 114 may be instituted as ROM, RAM, flash memory, or any sufficient memory capable of storing a set of commands. In other implementations, memory 114 may correspond to a plurality of memory types or modules.

As illustrated in FIG. 1, user device 110 includes rendering software application 120. User device 110 utilizes rendering software application 120 to quickly and efficiently render different scenes, such as scene 150. Scene 150 may include any scene or image that is capable of being rendered by user device 110, where scene 150 includes lights 151 and objects 152. Lights 151 may include all of the light sources within scene 150, such as natural and artificial light sources. Objects 152 may include any of the objects that are within scene 150, such as, but not limited to, people, furniture, buildings, walls, cars, animals, objects with volume (such as fog or smoke), or any other objects that can be rendered in a scene.

In order to quickly and efficiently render scene 150, rendering software application 120 first generates cache point database 121. Cache point database 121 may include a database of cache points that are located throughout scene 150, where each cache point stores information about light sources from lights 151 that are important at its location in scene 150. For example, cache point 122, which corresponds to one of the cache points stored in cache point database 121, includes location 123, extent 124, nearby lights 125, distant lights 126, surface distributions 127, and visibility list 128.

Location 123 may include the location of cache point 122 within scene 150. For example, location 123 may include (X,Y,Z) coordinates of cache point 122 within scene 150. Extent 124 may include how much area or volume within scene 150 that cache point 122 covers. For example, in one implementation, cache point 122 may correspond to a sphere. In such an implementation, extent 124 include the radius of the sphere so that rendering software application 120 can determine how much volume cache point 122 covers within scene 150.

It should be noted that location 123 may further include time information corresponding to location 123 of cache point 122 within scene 150. For example, if lights 151 within scene 150 are moving, location 123 may include a specific time or range of times for cache point 122. This is because different lights 151 within scene 150 will be important to cache point 122 at different times. As such, the time information for cache point 122 may further be used to determine the important lights for cache point 122 based on a given time.

Nearby lights 125 may include a list of light sources from lights 151 that are in close proximity to cache point 122, and thus important to cache point 122. For example, nearby lights 125 may include light sources from lights 151 that are within a certain distance from cache point 122 based on location 123 of cache point 122 and a location of each of lights 151. Cache point 122 thus stores nearby lights 125 since nearby lights 125 are likely to provide illumination at location 123 during a rendering of scene 150, thus making nearby lights 125 important at location 123. Furthermore, nearby lights 125 are stored in cache point 122 because the illumination from nearby lights 125 may vary drastically within the volume of cache point 122.

Distant lights 126 may include a list of light sources from lights 151 that are not in close proximity to cache point 122, however, still provide illumination at location 123 of cache point 122. As such, distant lights 126 includes importance 129 which ranks each of distant lights 126 based on an importance of the light sources to location 123. For example, distant lights 126 may include four different light sources from lights 151 that provide illumination at location 123 of cache point 122. In such an example, importance 129 may rank each of the four light sources in distant lights 126 based on how important each of the four light sources is at location 123, where importance is measured by how much illumination each of the four light sources provides to location 123. For example, the light source from the four light sources of distant lights 126 that provides the most illumination at location 123 may be ranked as the most important light source, while the light source from the four light sources that provides the least amount of illumination at location 123 may be ranked as the least important light source.

It should be noted that each of lights 151 within scene 150 may be accounted for when generated cache point 122. For example, cache point 122 will store all of nearby lights 125 and important distant lights 126 that provide illumination to cache point 122. As such, even lights from lights 151 that are not near cache point 122 have an opportunity to be one of distant lights 126 as long as they are important to cache point 122.

Surface distributions 127 may include a list of light sources from lights 151 that are important at location 123 of cache point 122 based on directions of the light sources. For example, surface distributions 127 may include six different direction distributions for cache point 122 based on the six cardinal directions (+X,−X,+Y,−Y,+Z,−Z). In such an example, surface distributions 127 further include a list of the light sources that are important to cache point 122 for each cardinal direction, such as important lights 130. Furthermore, surface distributions 127 include importance 132 for important lights 130, where importance 132 ranks each of important lights 130. For example, in one implementation, importance 132 ranks important lights 130 based on how much illumination each of important lights 130 provides to that cardinal direction for cache point 122. In this example, importance 132 may be based on an estimation of the amount of illumination that is provided by each of important lights 130.

It should be noted that the implementation of FIG. 1 illustrates nearby lights 125 and distant lights 126 as being separate from surface distributions 127, however, the present disclosure is not limited to the implementation of FIG. 1. For example, in other implementations, important lights 130 of surface distributions 127 may correspond to one or both of nearby lights 125 and distant lights 126. In such implementations, surface distributions 127 of cache point 122 store nearby lights 125 and/or distant lights 126 based on the directions of the light sources within nearby lights 125 and/or distant lights 126. For example, cache point 122 would store a list of nearby lights 125 for each of the six cardinal directions, and/or cache point 122 would store a list of distant lights 126 for each of the six cardinal directions.

It should further be noted that cache point 122 may further include an additional omnidirectional distribution for volumes and hair since volumes and hair are mostly translucent. As such, light sources from lights 151 within scene 150 are important from all directions in cases of hair and volumes. Therefore, it does not matter which direction each of nearby lights 125 and distant lights 126 is illuminating cache point 122 from. For example, the omnidirectional distribution for volumes and hair may include each of distant lights 126.

Visibility list 128 may include information for each of lights 151 that have had a ray shot towards it during a rendering of scene 150 from cache point 122. For each of the lights 151 that have had a ray shot at it during a rendering of scene 150, such as light 131, rendering software application 120 stores rays shot 133, rays hit 134, and weight 135. Rays shot 133 may include the number of rays that have been shot at light 131 from cache point 122 during every instance of the rendering of scene 150. Rays hit 134 may include the number of rays that have actually hit light 131 from cache point 122 during every instance of the rendering of scene 150. Finally, weight 135 may include the percentage (or a transformation from the percentage to a ratio) of rays that actually hit light 131 from cache point 122 during every instance of the rendering of scene 150.

For example, rendering software application 120 may have been used to render scene 150 four different times. In such an example, eight of the ten rays shot at light 131 from cache point 122 during the first rendering may have hit light 131; seven of the ten rays shot at light 131 from cache point 122 during the second rendering may have hit light 131; four of the five rays shot at light 131 from cache point 122 during the third rendering may have hit light 131; and two of the five rays shot at light 131 from cache point 122 during the fourth rendering may have hit light 131. As such, rays shot 133 for light 131 would include thirty rays; rays hit 134 for light 131 would include the twenty-one rays; and weight 135 would include seventy percent.

It should be noted that the implementation of FIG. 1 only illustrates one cache point 122 stored in cache point database 121, however, the present disclosure is not limited to the implementation of FIG. 1. In other implementations, there may be any number of cache points stored in cache point database 121 for scene 150. In such implementations, each of the cache points stored in cache point database 121 may be similar to cache point 122. For example, cache point database 120 may store hundreds, thousands, or even millions of cache points in cache point database 121 for scene 150. In such an example, each of the cache points would be similar to cache point 122, except that each of the cache points would be located in a different location throughout scene 150.

Also illustrated in FIG. 1, rendering software application 120 includes algorithm 140. Rendering software application 120 utilizes algorithm 140 to both generate cache point database 121 for scene 150 and to render rendered scene 160 using cache point database 121, where rendered scene 160 corresponds to a scene rendered by rendering software application 120 based on scene 150. Algorithm 140 generates cache point database 121 for scene 150 using suggested cache points 141, cache point removal 142, cache point filter 143, and cache point updating 144, and renders rendered scene 160 using scene rendering 145.

Suggested cache points 141 may include all of the initial cache points that are generated by algorithm 140 when initially generating cache point database 121. To generate suggested cache points 141, rendering software application 120 first uses algorithm 120 to shoot rays 146 through scene 150. For example, rendering software application 120 may utilize algorithm 140 to shoot rays 146 through scene 150 from a camera view of scene 150 in a similar way as if rendering software application 120 were rendering an image. As such, rays 146 may be reflected off objects 152 within scene 150, or rays 146 may be refracted through objects 152 within scene 150 based on the material properties of objects 152. At places where rays 146 hit objects 152 within scene 150, rendering software application 120 may generate one of suggested cache points 141.

Light distributions 147 may include all of the important light sources from lights 151 for each of suggested cache points 141. For example, light distributions 147 may include the nearby lights, the distant lights, and the surface distribution for each of suggested cache points 141. In such an example, the nearby lights, the distant lights, and the surface distribution for each of suggested cache points 141 is similar to nearby lights 125, distant lights 126, and surface distributions 127 of cache point 122 discussed above.

After generating suggested cache points 141, algorithm 140 may then utilize cache point removal 142 to prune suggested cache points 141. In one implementation, cache point removal 142 may prune suggested cache points 141 based on the density of suggested cache points 141 within scene 150. For example, cache point removal 142 may remove some of suggested cache points 141 in areas of scene 150 where there is a high density of suggested cache points 141. In another implementation, cache point removal 142 may prune suggested cache points 141 based on light distributions 147 of suggested cache points 141. For example, if two of suggested cache points 141 are near each other in scene 150 and have similar light distributions 147, one of the two suggested cache points 141 may be pruned. Finally, still other implementations, cache point removal 142 may prune suggested cache points 141 based on both the density of suggested cache points 141 within scene 150 and light distributions 147 of suggested cache points 141 within scene 150.

After pruning some of suggested cache points 141 using cache point removal 142, algorithm 140 may then utilize cache point filter 143 to filter the remaining suggested cache points 141 in order to generate the cache points within cache point database 121. In one implementation, cache point filter 143 filters the remaining suggested cache points 141 based on light distributions 147 of the remaining suggested cache points 141. In such an implementation, if two of the remaining suggested cache points 141 that are close to each other in scene 150 include very different light distributions 147, such as by the lighting within scene 150 drastically changes where the two remaining suggested cache points 141 are located, cache point filter 143 filters light distributions 147 for each of the two remaining cache points 141 such that the light distributions 147 are similar to each other. In one implementation, filtering light distributions 147 for two of the remaining suggested cache points 141 to make light distributions 147 similar to each other may include talking a weighted average of the two light distributions 147.

Cache point updating 144 is utilized by algorithm 140 to update each of the cache points within cache point database 121. For example, and as discussed above, visibility list 128 of cache point 122 may include information for each of lights 151 that have had a ray shot towards it during a rendering of scene 150 from cache point 122. In this example, algorithm 140 may utilize cache point updating 144 to update visibility list 128 for cache point 122 each time scene 150 is rendered by rendering software application 120. Rendering software application 120 may thus utilize cache point updating 144 of algorithm 140 to update the visibility list of each of the cache points within cache point database 121.

Scene rendering 145 may be utilized by rendering software application 140 to render rendered scene 160 using cache point database 121, where rendered scene 160 corresponds to a scene that is rendered based on scene 150. Scene rendering 145 may thus use cache point database 121 when rendering rendered scene 160 to determine which lights 151 to sample at shading points throughout scene 150. For example, scene rendering 145 may look at the nearest cache point from cache point database 121 to the shading point and determine which of lights 151 to sample based on the information stored in the nearest cache point. For example, if cache point 122 is the nearest cache point to a shading point within scene 150, scene rendering 145 may use one or more of nearby lights 125, distant lights 126, surface distributions 127, and visibility list 128 from cache point 122 to determine which of lights 151 to sample at the shading point.

For example, if rendering software application 120 is rendering a shading point near cache point 122 while rendering rendered scene 160, rendering software application 120 may shoot rays at nearby lights 125 since nearby lights 125 are important at location 123 of cache point 122 and most likely provide illumination at location 123. Rendering software application 120 may further shoot rays at distant lights 126 since distant lights 126 are also important at location 123 of cache point 122 because distant lights 126 provide illumination at location 123. However, when shooting rays at distant lights 126, rendering software application 120 may use importance 129 to determine how important each of distant lights 126 is to cache point 122 and shoot more rays at the light sources from distant lights 126 that are more important to cache point 122 than the light sources from distant lights 126 that are not as important to cache point 122.

It should be noted that in one implementation, when determining which lights to shoot rays at, rendering software application 120 may combine each of nearby lights 125 and distant lights 126 into a single distribution. In such an implementation, samples are then drawn from the single distribution based on the importance of nearby lights 125 and distant lights 126, where an importance for nearby lights 125 is determined using a similar method as described above for distant lights 126. For example, when determining the importance of nearby lights 125, the actual surface normal of a surface that is being shaded is used for determining the importance if of nearby lights 125.

For a second example, and still using the example above where rendering software application 120 is rendering a shading point near cache point 122 while rendering rendered scene 160, rendering software application 120 may further utilize surface distributions 127 when the shading point is located on a surface of one of objects 152. In such an example, when shading the surface of the one of objects 152, rendering software application 120 chooses the three closest surface distributions that are pointing in the same directions as the surface normal of the surface of the one of objects 152. Rendering software application 120 then interpolates between important lights 130 for the three chosen surface distributions to generate a list of important light sources for the surface normal of the surface. Finally, rendering software application 120 uses the list of important light sources for the surface normal of the surface to determine which light sources from lights 151 to shoot rays at for the shading point.

Finally, for a third example, and still using the example above where rendering software application 120 is rendering a shading point near cache point 122 while rendering rendered scene 160, rendering software application 120 may further utilize visibility list 128 when choosing which light sources to shoot rays at for the shading point. In such an example, rendering software application 120 may choose to shoot more rays at the light sources that have a greater weight than light sources with a lower weight value. For example, rendering software application 120 may shoot more rays at a light source that has been hit eighty percent of the time with rays during previous renderings of scene 150 than a light source that has only been hit ten percent of the time. This is because light sources with a lower weight probably have objects blocking their light from reaching cache point 122.

It should be noted that, in the examples above, rendering software application 120 may use a combination of nearby lights 125, distant lights 126, surface distributions 127 and visibility list 128 when choosing which light sources to shoot rays at while rendering the shading point. For example, rendering software application 120 may utilize visibility list 128 with either of nearby lights 125, distant lights 126, or surface distributions 127 to better determine which light sources to shoot more rays at when rendering the shading point based on the weights of the light sources from visibility list 128. Furthermore, and as discussed above in one implementation, important lights 130 from surface distributions 127 may include distant lights 128 for each cardinal direction. In such an implementation, rendering software application 120 would interpolate between distant lights 128 for the three closest surface distributions that are pointing in the same direction as the surface normal of the surface of the object.

Figure 2:
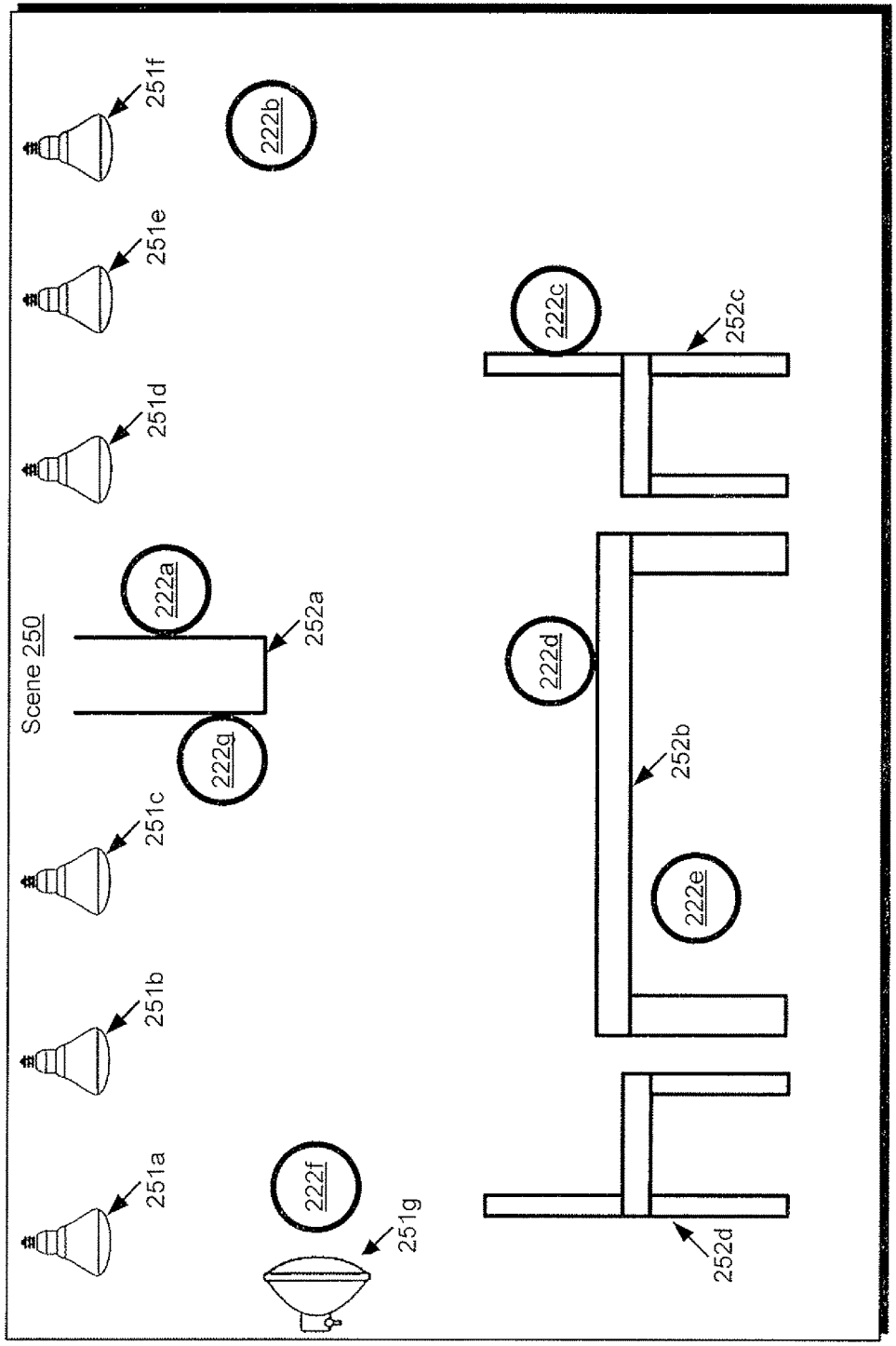
FIG. 2 presents an example of cache points located within a scene that includes light sources, according to one implementation of the present disclosure.

FIG. 2 presents an example of cache points located within a scene that includes light sources, according to one implementation of the present disclosure. FIG. 2 includes scene 250 which includes light 251a, light 251b, light 251c, light 251d, light 251e, light 251f, and light 251g, collectively referred to as lights 251, and object 252a, object 252b, object 252c, and object 252d, collectively referred to as objects 252. Scene 250 further includes cache point 222a, cache point 222b, cache point 222c, cache point 222d, cache point 222e, cache point 222f, and cache point 222g, collectively referred to as cache points 222, located throughout scene 250. With regard to FIG. 2, it should be noted that each of cache points 222, scene 250, lights 251, and objects 252 correspond respectively to cache point 122, scene 150, lights 151, and objects 152 from FIG. 1.

As illustrated in FIG. 2, cache points 222 are distributed at different locations throughout scene 250. Each of cache points 222 within scene 250 may be similar to cache point 122 from FIG. 1 and thus may store information that includes a location and dimension for the cache point, and also nearby lights, distant lights, surface distributions, and visibility list for the important light sources of the cache point. A rendering software application may thus use cache points 222 when shading different shading points within scene 250 during a rendering of scene 250.

For example, shading point 222a may store light 251c, light 251d, and light 251e as nearby lights since those light sources have a location that is in close proximity to cache point 222a, and light 251f as a distant light since light 251f would contribute illumination to cache point 222a. When rendering a shading point near cache point 222a, the rendering software application may thus shoot rays at each of light 251c, light 251d, light 251e, and light 251f. However, if cache point 222a has further stored visibility information for light 251c during previous renderings of scene 250, which would include a weight of zero since object 270 blocks light from light 251c from reaching cache point 222a, the rendering software application may use the visibility information and not shoot any rays at light 251c based on the weight of zero.

For another example, shading point 222b may include light 251e and light 251f as nearby lights since those light sources have a location that is in close proximity to cache point 222b, and light 251d and light 251d as distant lights since those light sources would contribute illumination to cache point 222b. When rendering a shading point near cache point 222b, the rendering software application may thus shoot rays at each of light 251d, light 251e, light 251f, and light 251g. However, the rendering software application may shoot more rays at distant light 251d than distant light 251g since distant light 251d is closer to cache point 222b than distant light 251g and thus probably contributes a greater amount of illumination to cache point 222b.

It is noted that a rendering software application would use a similar method as discussed above with respect to cache point 222a and cache point 222b when rendering shading points near each of cache points 222c-g. By using cache points 222 to render scene 250, the rendering software application is able to quickly and efficiently render scene 250 because the rendering software application can quickly determine which of lights 251 to shoot rays at for different shading points within scene 250 by using the information stored in each of cache points 222.

It is further noted that the implementation of FIG. 2 only illustrates seven cache points 222 located throughout scene 250 for clarity purposes, however, the present disclosure is not limited to the implementation of FIG. 2. In other implementations, there may be any number of cache points located within scene 250. For example, there may be hundreds, thousands, or millions of cache points located throughout scene 250.

Figure 3:
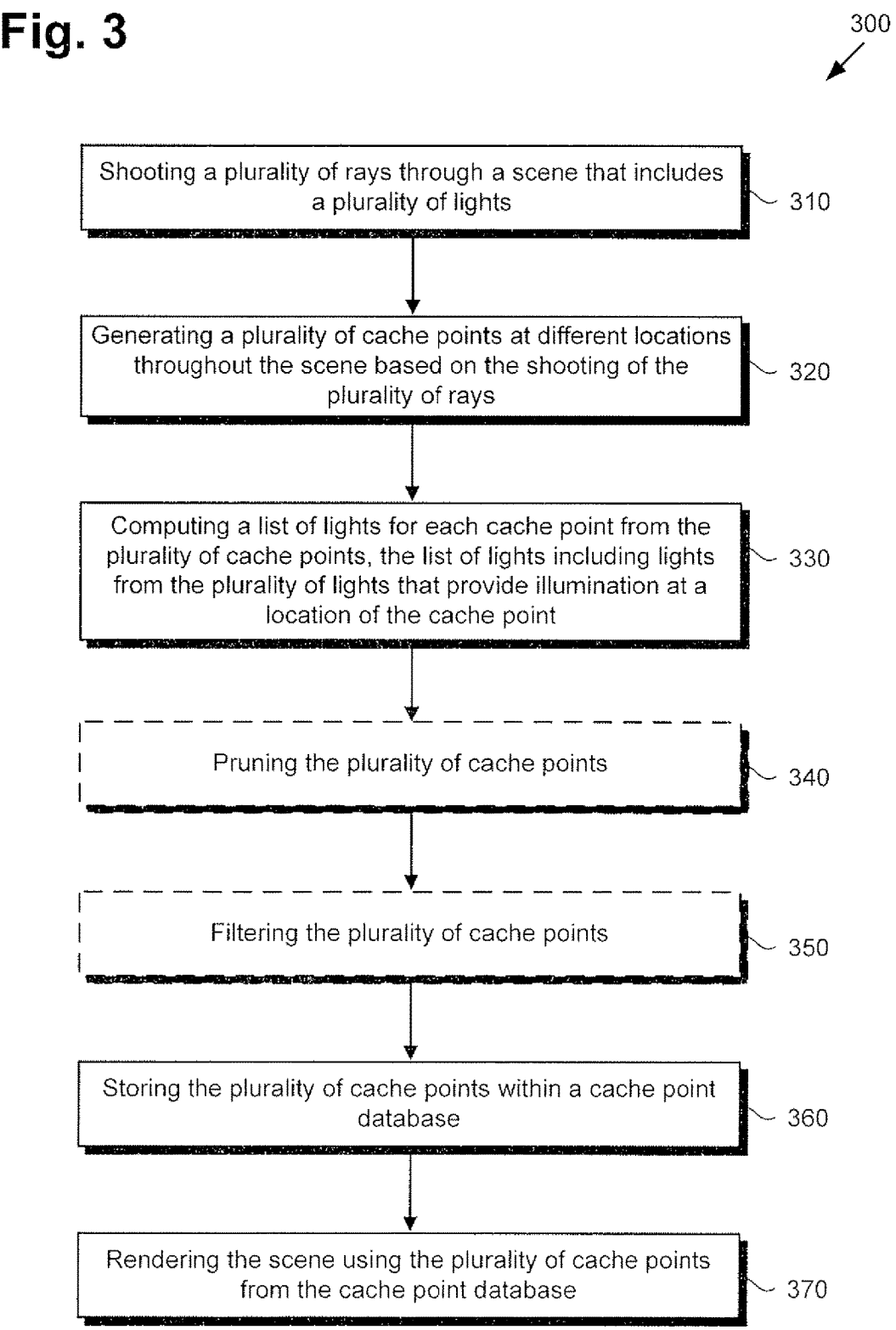
FIG. 3 shows a flowchart illustrating a method for distribution caching for direct lights, according to one implementation of the present disclosure.

FIG. 3 shows a flowchart illustrating a method for distribution caching for direct lights, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 1, the disclosed inventive concepts are not intended to be limited by specific features shown and described with respect to FIG. 1. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 includes shooting a plurality of rays through a scene that includes a plurality of lights (310). For example, processor 111 of user device 110 may execute rendering software application 120 to shoot rays 146 through scene 150 that includes lights 151, where lights 151 are the light sources within scene 150. As discussed above, rays 146 may be reflected off objects 152 within scene 150, or rays 146 may be refracted through objects 152 within scene 150, based on the material properties of objects 152.

Flowchart 300 also includes generating a plurality of cache points at different locations throughout scene based on the shooting of the plurality of rays (320). For example, processor 111 of user device 110 may execute rendering software application 120 to generate suggested cache points 141, where suggested cache points 141 are located throughout scene 150 based on the shooting of rays 146. As discussed above, suggested cache points 141 may be generated throughout scene 150 at places where rays 146 hit objects 152 within scene 150.

Flowchart 300 also includes computing a list of lights for each cache point from the plurality of cache points, the list of lights including lights from the plurality of lights that provide illumination at a location of the cache point. (330). For example, processor 111 of user device 110 may execute rendering software application 120 to compute light distributions 147 for each cache point from suggested cache points 141, where light distributions 147 includes lights from lights 151 within scene 150 that provide illumination at a location of the cache point. As discussed above, important lights that provide illumination for light distributions 147 may include nearby lights and distant lights. Furthermore, important lights that provide illumination for light distributions 147 may also include surface distributions for each of the nearby lights and the distant lights.

Optionally, flowchart 300 includes pruning the plurality of cache point (340). For example, processor 111 of user device 110 may execute rendering software application 120 to prune suggested cache points 141. As discussed above, rendering software application 120 may prune suggested cache points 141 based on the density of suggested cache points 141 within scene 150 and/or light distributions 147 of suggested cache points 141. After pruning suggested cache points 141, flowchart 300 may further optionally include filtering the cache points (350). For example, processor 111 of user device 110 may execute rendering software application 120 to filter the remaining suggested cache points 141. As discussed above, rendering software application 120 may filter the remaining suggested cache points 141 at locations within scene 150 where the lighting changes by interpolating light distributions 147 between neighboring cache points at those locations.

Flowchart 300 also includes storing the plurality of cache points within a cache point database (360). For example, processor 111 of user device 110 may execute rendering software application 120 to store suggested cache points 141 in cache point database 121. As discussed above, rendering software application 120 may store suggested cache points 141 in cache point database 121 after suggested cache points 141 have been pruned and filtered.

Flowchart 300 also includes rendering the scene using the plurality of cache points from the cache point database (370). For example, processor 111 of user device 110 may execute rendering software application 120 to render rendered scene 160 using the cache points within cache point database 121, where rendered scene 160 corresponds to a scene rendered by rendering software application 120 based off of scene 150. As discussed above, when rendering rendered scene 160, rendering software application 120 uses the cache points within cache point database 121 to determine which of lights 151 to shoot rays at for different shading points by using the nearest cache point to the shading point. Each cache point from cache point database 121 may be similar to cache point 122 and include information corresponding to location 123, extent 124, nearby lights 125, distant lights 126, surface distributions 127, and visibility list 128.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a memory; and
a processor configured to execute a rendering software application to:
shoot a plurality of rays through a scene that includes a plurality of lights;
generate a plurality of cache points at different locations throughout the scene based on the shooting of the plurality of rays;
compute a list of lights for each cache point from the plurality of cache points, the list of lights including lights from the plurality of lights that provide illumination at a location of each of the plurality of the cache points, wherein the list of lights includes first lights from the plurality of lights;
rank the first lights based on an amount of light each of the first lights provides to each of the plurality of the cache points; and
store the plurality of cache points in the memory.

2. The system of claim 1, wherein each of the plurality of cache points is generated at a location in the scene where one of the plurality of rays hits an object within the scene.

3. The system of claim 1, wherein the list of lights includes second lights from the plurality of lights, wherein each of the second lights includes a location in the scene that is in closer proximity to the location of the cache point than the first lights.

4. The system of claim 1, wherein the processor is further configured to execute the rendering software application to render the scene using the plurality of cache points.

5. The system of claim 1, wherein the processor is further configured to execute the rendering software application to prune the plurality of cache points based on a density of the plurality of cache points within the scene.

6. The system of claim 1, wherein the processor is further configured to execute the rendering software application to filter the plurality of cache points based on the list of lights between neighboring cache points from the plurality of cache points.

7. A system comprising:
a memory; and
a processor configured to execute a rendering software application to:
   shoot a plurality of rays through a scene that includes a plurality of lights;
   generate a plurality of cache points at different locations throughout the scene based on the shooting of the plurality of rays;
   compute a list of lights for each cache point from the plurality of cache points, the list of lights including lights from the plurality of lights that provide illumination at a location of each of the plurality of the cache points;
   prune the plurality of cache points based on a density of the plurality of cache points within the scene; and
   store the plurality of cache points in the memory.

8. A system comprising:
a memory; and
a processor configured to execute a rendering software application to:
   shoot a plurality of rays through a scene that includes a plurality of lights;
   generate a plurality of cache points at different locations throughout the scene based on the shooting of the plurality of rays;
   compute a list of lights for each cache point from the plurality of cache points, the list of lights including lights from the plurality of lights that provide illumination at a location of each of the plurality of the cache points;
   filter the plurality of cache points based on the list of lights between neighboring cache points from the plurality of cache points; and
   store the plurality of cache points in the memory.

9. A method for use by a system having a processor and a memory for rendering a scene using a plurality of cache points, the method comprising:
   shooting, using the processor, a plurality of rays through the scene that includes a plurality of lights;
   generating, using the processor, a plurality of cache points at different locations throughout the scene based on the shooting of the plurality of rays;
   computing, using the processor, a list of lights for each cache point from the plurality of cache points, the list of lights including lights from the plurality of lights that provide illumination at a location of each of the plurality of the cache points, wherein the list of lights includes first lights from the plurality of lights;
   ranking the first lights based on an amount of light each of the first lights provides to each of the plurality of the cache points; and
   storing, using the processor, the plurality of cache points in the memory.

10. The method of claim 9, wherein each of the plurality of cache points is generated at a location in the scene where one of the plurality of rays hits an object within the scene.

11. The method of claim 9, wherein the list of lights includes second lights from the plurality of lights, wherein each of the second lights includes a location in the scene that is in closer proximity to the location of the cache point than the first lights.

12. The method of claim 9, wherein the method further comprises rendering the scene using the plurality of cache points.

13. The method of claim 9, wherein the method further comprises pruning the plurality of cache points based on a density of the plurality of cache points within the scene.

14. The method of claim 9, wherein the method further comprises filtering the plurality of cache points based on the list of lights between neighboring cache points from the plurality of cache points.

15. A method for use by a system having a processor and a memory for rendering a scene using a plurality of cache points, the method comprising:
   shooting, using the processor, a plurality of rays through the scene that includes a plurality of lights;
   generating, using the processor, a plurality of cache points at different locations throughout the scene based on the shooting of the plurality of rays;
   computing, using the processor, a list of lights for each cache point from the plurality of cache points, the list of lights including lights from the plurality of lights that provide illumination at a location of each of the plurality of the cache points;
   pruning the plurality of cache points based on a density of the plurality of cache points within the scene; and
   storing, using the processor, the plurality of cache points in the memory.

16. The method of claim 15, wherein the list of lights includes second lights from the plurality of lights, wherein each of the second lights includes a location in the scene that is in closer proximity to the location of the cache point than the first lights.

17. The method of claim 15, wherein the method further comprises rendering the scene using the plurality of cache points.

18. A method for use by a system having a processor and a memory for rendering a scene using a plurality of cache points, the method comprising:
   shooting, using the processor, a plurality of rays through the scene that includes a plurality of lights;
   generating, using the processor, a plurality of cache points at different locations throughout the scene based on the shooting of the plurality of rays;
   computing, using the processor, a list of lights for each cache point from the plurality of cache points, the list of lights including lights from the plurality of lights that provide illumination at a location of each of the plurality of the cache points;
   filtering the plurality of cache points based on the list of lights between neighboring cache points from the plurality of cache points; and
   storing, using the processor, the plurality of cache points in the memory.

19. The method of claim 18, wherein the list of lights includes second lights from the plurality of lights, wherein each of the second lights includes a location in the scene that is in closer proximity to the location of the cache point than the first lights.

20. The method of claim 18, wherein the method further comprises rendering the scene using the plurality of cache points.

* * * * *